United States Patent [19]
Brannin

[11] 3,942,591
[45] Mar. 9, 1976

[54] AGRICULTURAL IMPLEMENT

[76] Inventor: Jafie R. Brannin, 3535 St. Germaine Court, Louisville, Ky. 40207

[22] Filed: Aug. 5, 1974

[21] Appl. No.: 494,791

[52] U.S. Cl. .................. 172/371; 30/314; 30/353; 172/375; D8/7; D8/11
[51] Int. Cl.².... A01B 1/08; A01B 1/10; B26B 3/00; B26B 9/02
[58] Field of Search ...................... 172/371–381; 30/171, 314, 353; D8/7, 11

[56] References Cited
UNITED STATES PATENTS

| 132,444 | 10/1872 | Cookerly | 172/371 |
| 177,311 | 5/1876 | Wright | 172/376 |
| 718,534 | 1/1903 | Shedd | 172/372 |
| 797,840 | 8/1905 | Choate | 172/372 |
| 800,872 | 10/1905 | Newcomb | 172/378 |
| 936,038 | 10/1909 | Richards | 172/375 |
| 1,000,473 | 8/1911 | Wilson | 172/371 |
| 1,091,058 | 3/1914 | Godward | 172/372 |
| 1,113,984 | 10/1914 | Glass | 172/375 X |
| 1,259,944 | 3/1918 | Welch, Jr. | 172/371 |
| 1,279,704 | 9/1918 | Jones | 172/371 |
| 1,823,438 | 9/1931 | Craig | 172/372 |
| 1,901,778 | 3/1933 | Schlag | 172/372 |
| 2,264,636 | 12/1941 | Griswold et al. | 172/371 |
| 2,771,019 | 11/1956 | Zeitz | 172/372 |
| 3,240,277 | 3/1966 | Henry | 172/375 |

Primary Examiner—Edgar S. Burr
Assistant Examiner—Steven A. Bratlie
Attorney, Agent, or Firm—Wm. R. Price

[57] ABSTRACT

A multi-purpose agricultural implement usable in one position for cutting roots of weeds just below the surface of the ground and simultaneously therewith pulverizing the upper crust of the earth; usable in a second position for cutting a furrow of any desired width or depth in the ground of planting seeds and fertilizing; and, usable in a third position for covering the furrow. The implement is comprised of a flat blade and a handle, the flat blade being of four sided construction with opposite sides of the blade being substantially parallel. The handle is attached to the upper surface of the blade and extends in a backward direction at a sidewise oblique angle with the upper surface.

1 Claim, 5 Drawing Figures

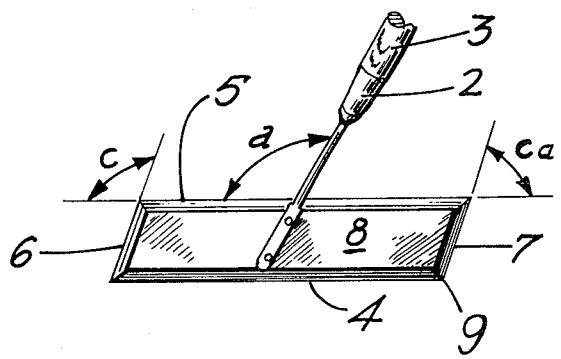
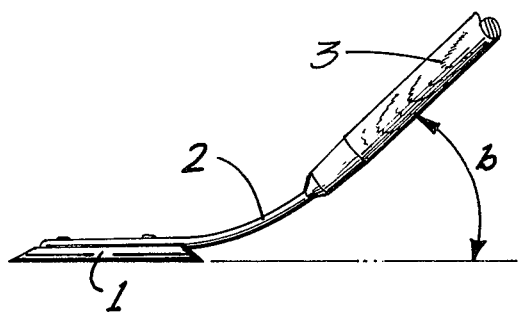
Fig.1  Fig.2
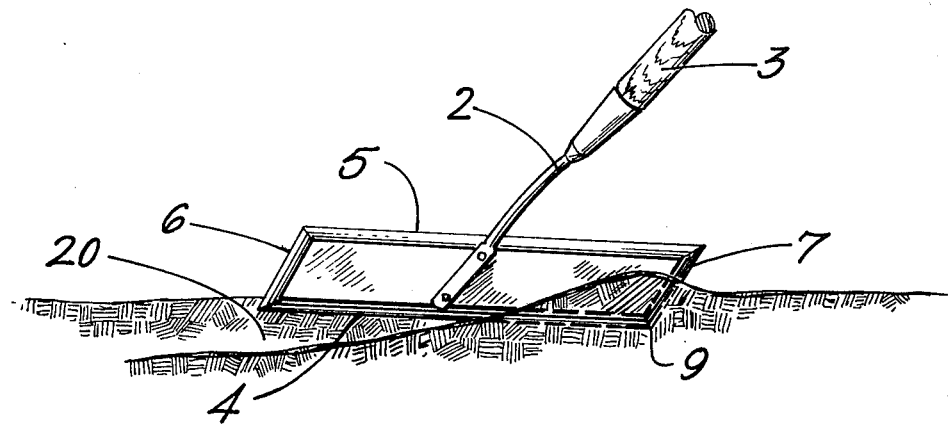
Fig.3
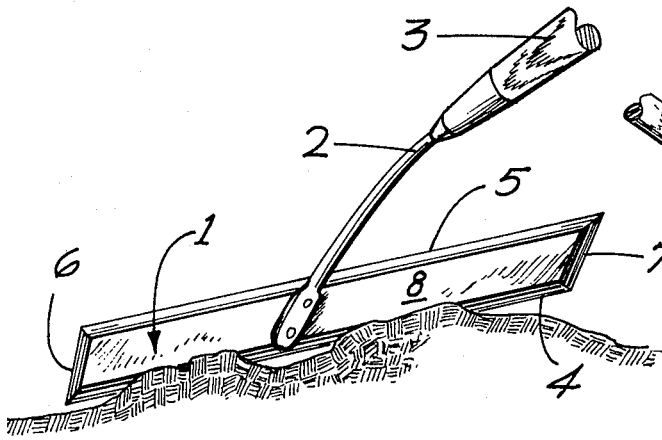
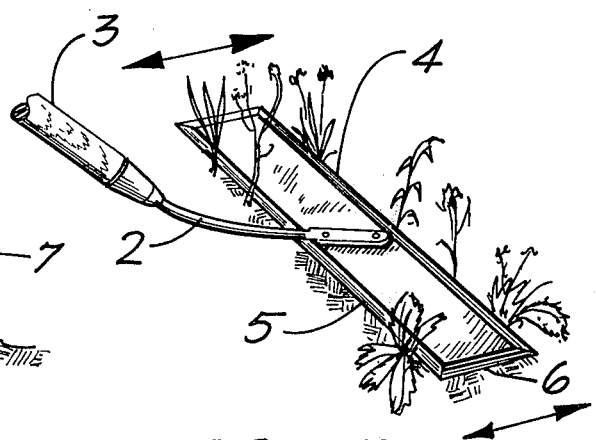
Fig.4  Fig.5

AGRICULTURAL IMPLEMENT

BACKGROUND OF THE INVENTION

This invention relates to a multi-purpose agricultural implement. More particularly, the invention relates to an agricultural implement for use as a device for cutting roots of weeds just below the surface of the ground and simultaneously therewith pulverizing the upper crust of the earth; furrowing for seeding or fertilizing; and, covering the furrows.

Agricultural implements of various kinds are known for use in manual operations for working the soil, cutting weeds and their roots beneath the surface of the ground, pulverizing the upper crust of the earth for planting of weeds, furrowing the pulverized crust for planting of seeds, and hoeing or covering the planted seeds or fertilizer. Furthermore, various kinds of agricultural implements have been used which accomplish a combination of these agricultural operations. However, a single implement which is simply constructed and economical for purchase by the average homeowner who desires to have his own garden spot which is useful for weeding, pulverizing the upper crust of the earth, furrowing, and covering the furrows is not known.

DESCRIPTION OF THE PRIOR ART

Wright pointed out as early as 1876 in U.S. Pat No. 177,311 that rhombodial shaped hoe blades having cutting edges on all sides were known. He proposed an implement having such a blade but having a handle attached thereto at an oblique and sidewise angular inclination. The angular inclination of the handle was such, however, that maximum use of the front and rear cutting edges was not suitable for most gardeners. Accordingly, subsequent inventors such as Richards in U.S. 936,038; Pottorf in U.S. Pat. No. 1,210.100; Calkins in U.S. Pat. No. 1,328,124 1,210,100; and Zeitz in U.S. Pat. No. 2,771,019 have proposed handles which were adjustable or even oscillatable relative to the blade.

SUMMARY OF THE INVENTION

This invention relates to an agricultural implement having a rhombodial shaped flat blade with cutting surfaces on all sides which has a definite and fixed angular relationship to a handle, fixedly attached thereto so as to offer maximum utilization of the front and rear cutting surfaces to the average gardener.

The present invention advantageously provides a straightforward arrangement for an agricultural implement which is easily constructed, inexpensive to the average homeowner and accomplishes a plurality of agricultural operations. The present invention further provides a method for weeding and simultaneously therewith pulverizing the upper crust of the earth, as well as methods for furrowing and covering the furrows for planting and fertilizing.

More particularly, the present invention provides an agricultural implement comprising a flat blade having an upper and lower surface with front and back cutting edges in parallel and opposed side cutting edges disposed between and connecting with opposite ends of the front and back cutting edges, the side cutting edges being in parallel and forming obtuse angles with the back cutting edge as measured from the right. A handle is attached to the upper surface of the blade at substantially the center of the upper surface, the handle extending angularly in a backward-upward direction in a sidewise-oblique angle with the upper surface, the sidewise disposition of the handle forming an obtuse angle with the back cutting edge as measured from the right, the obtuse angle of the handle being greater than the obtuse angle of the side cutting edges with the back cutting edge.

Even more particularly, the present invention provides a method of removing weeds and roots from beneath the surface of the earth's crust comprising the steps of: (a) moving alternatively forwardly and backwardly on the ground a flat cutting blade having an upper and lower surface with front and back cutting edges in parallel and opposed side cutting edges disposed between and connected with opposite ends of the front and back cutting edges, the side cutting edges being in parallel and forming an obtuse angle with the back cutting edge as measured from the right; and, (b) moving alternatively forwardly and backwardly the front the back cutting edges of said flat cutting blade beneath the surface.

Also, the present invention provides a method of furrowing a section of earth comprising the step of: moving in a sustantially straight line the flat blade of said agricultural implement held at an angle to said straight line relative to the desired width of said furrow, said flat blade having an upper and lower surface with front and back cutting edges in parallel and opposed side cutting edges disposed between and connecting with opposite ends of the front and back cutting edges, the side cutting edges being disposed generally in parallel to said straight line, the angle of deviation from said parallel disposition being the determinative factor in the width of the furrow; and, a handle attached to the upper surface of the blade at substantially the center of the upper surface, the handle extending angularly in a backward-upward direction at a sidewise-oblique angle, the sidewise direction of the handle forming an obtuse angle with the back cutting edge when viewed from the right, the blade being disposed at an angle relative to the desired furrow so that a furrow of desired and uniform width is formed. The handle is disposed in a vertical position and pressure on said handle is determinative of the depth of said furrow.

Furthermore, the present invention provides a method of covering a furrow comprising the step of: moving in a substantially straight line a flat blade of an agricultural implement, the flat blade having an upper and lower surface with front and back cutting edges in parallel and opposed side cutting edges disposed between and connecting with opposite ends of the front and back cutting edges, the side cutting edges being in parallel and forming obtuse angles with the back cutting edge as measured from the right, the flat blade being disposed in a vertical position with the forward cutting edge communicating with the furrow to be covered.

It is to be understood that the description of the examples of the present invention given hereinafter are not by way of limitation and various modifications within the scope of the present invention will occur to those skilled in the art upon reading the disclosure set forth hereinafter.

BRIEF DESCRIPTION OF THE DRAWINGS

FIG. 1 discloses a plan view, partially cut away, of an agricultural implement of the present invention;

FIG. 2 is an elevational view, partially cut away, of the agricultural implement of FIG. 1;

FIG. 3 is a perspective view, partially cut away, of the agricultural implement of FIG. 1 disposed in a position to make a furrow;

FIG. 4 is a perspective view of the agricultural implement of FIG. 1 in a position for covering a furrow; and, FIG. 5 is a perspective view of the agricultural implement of FIG. 1 in a position for removing weed roots from beneath the surface of the earth's crust.

DESCRIPTION OF THE PREFERRED EMBODIMENT

Referring to FIG. 1 of the drawing, an argiculatural implement is shown having a cutting blade 1 and a handle with a lower metal ferrule section 2 and an upper shaft section 3. Blade 1 includes four cutting edges, a front cutting edge 4 and a back cutting edge 5, said cutting edges 4 and 5 being in parellel. Right side cutting edge 6 and left side cutting edge 7 are also provided, side right and left cutting edges 6 and 7 being parallel and at their ends connecting with front cutting edge 4 and back cutting edge 5. It is noted that the cutting edges 4 and 7 as well as cutting edges 5 and 6 form obtuse angles at the juncture thereof and at the juncture of cutting edges 4 and 6 as well as 5 and 7, form acute angles. As is shown in the Figures, the right side cutting edges 6 forms an obtuse angle c of approximately 110° with the back cutting edge 5 viewed from the position of one using the tool with the blade in a substantially horizontal plane, said obtuse angle being generally from about 100° to 120°. An acute angle Ca is formed by side cutting edge 7 and rear cutting edge 5.

The blade 1 is generally made of a thin piece of highly tempered tool steel and is somewhat narrow with the parallel cutting edges 4 and 5 being longer than the side cutting edges 6 and 7. Furthermore, the upper surface 8 is beveled around the periphery or or cutting edges thereof. The bottom surface (not shown) is left flat thereby making the edges sharp for cutting weeds, pulverizing dirt, and further provides sharp side edges 6 and 7 for furrowing, to be discussed hereinafter.

The lower ferrule section 2 of the handle is fixedly attached to the upper surface 8 at substantially the center of the surface 8. As shown in FIGS. 1 and 2 the lower section 2 extends in a backward-upward oblique angle with the upper surface 8 and the cutting edges 6 and 7. It is noted that the lower section 2 forms the angle a in relation to the cutting edges 5 as viewed from the right, the angle a being about 120° as shown and is generally from about 105° to 135°. The upward angle b shown in FIG. 2 is about 40° and is generally from about 30° to 50°, the lower portion 2 generally forming an arc so that the upper section 3 is at about the desired angle with the flat plate 1.

It is noted that the handle is made of wood with the lower portion 2 being a female metal ferrule for receiving the wooded shaft portion 3. It is realized that the entire handle may be made in one piece with the appropriate angle being formed at the attachment to the blade. Further, the handle may be permanently welded to the blade or detachably connected by means of bolts or the like.

FIG. 3 of the invention of the agricultural implement is shown in a position for cutting a furrow. A furrow is made by moving in a straight line the side cutting edges 6 and 7 of the agricultural implement with the long axis of the blade slightly angularly disposed relative to the projected line along which the furrow 20 is to be laid. By changing the angular disposition of the long axis of the blade relative to the straight line along which the furrow is to be made, the width of the furrow can be widened or made more narrow as desired. Further, the depth of the furrow can be very carefully controlled.

FIG. 4 shows the position of the agricultural implement when being used to cover a furrow. The method for covering the furrow is to turn the agricultural implement to a position wherein the flat blade is disposed in a vertical position with the front cutting edge 4 communicating with the furrow to be covered and then moving the implement in a substantially straight line. Movement is generally toward the operator as the operator pulls the implement along the furrow.

FIG. 5 shows the operation of the exemplified implement in removing weed roots from beneath the surface of the earth's crust. In this operation, the operator places the flat cutting blade 1 flat against the ground, then gradually moving the front and back cutting edges 4 and 5 into the ground thereby cutting beneath the surface of the soil. Movement continues in an alternately forwardly and backwardly fashion cutting roots and pulverizing the soil. The operator preferably works backwardly so as not to step on the freshly worked ground. This eliminates pressure germination of the freshly cut weeds by eliminating foot pressure on the worked ground.

It will be realized that various changes may be made to the specific embodiment shown and described without departing from the principles and spirit of the present invention.

What is claimed is:

1. An agriculture implement comprising: a flat rhomboidal blade having an upper and lower surface beveled from the upper surface to the lower surface forming parallel front and back cutting edges, and forming opposed parallel side cutting edges connecting the front and back cutting edges, said front and back cutting edges being of substantially greater length than the side cutting edges, the back cutting edge being the edge nearest a single curved tang which connects said flat rhomboidal blade with a handle extending rearwardly to an end;

the right side cutting edge when viewed from the end of the handle toward the blade forming an obtuse angle (c) of between 100° and 120° with said back cutting edge;

said single tang attached directly to the upper surface of said blade without intervening structure at substantially the center of said upper surface and forming an obtuse angle (a) of between 105° to 135° between the right side of said tang and said back cutting edge when viewed from the end of the handle toward the blade, said single tang being curved concavely upward toward the handle when viewed from said front cutting edge with the lower surface in a substantially horizontal plane;

said single tang and said handle having no means for angular adjustment of said blade with respect to said handle; and the angle (b) formed between said handle and said lower surface relative to said back cutting edge ranges between 30° to 50°.

\* \* \* \* \*